United States Patent
Shimek et al.

(10) Patent No.: US 10,836,479 B2
(45) Date of Patent: Nov. 17, 2020

(54) ROTATING SWASHPLATE RING TO ROTOR MAST CONNECTION

(71) Applicant: Bell Textron Inc., Fort Worth, TX (US)

(72) Inventors: Glenn Alan Shimek, Kennedale, TX (US); Mark Adam Wiinikka, Hurst, TX (US); Michael Dean Dearman, Weatherford, TX (US)

(73) Assignee: Bell Textron Inc., Fort Worth, TX (US)

(*) Notice: Subject to any disclaimer, the term of this patent is extended or adjusted under 35 U.S.C. 154(b) by 228 days.

(21) Appl. No.: 16/012,094

(22) Filed: Jun. 19, 2018

(65) Prior Publication Data
US 2019/0382107 A1 Dec. 19, 2019

(51) Int. Cl.
*B64C 27/605* (2006.01)
*B64F 5/40* (2017.01)

(52) U.S. Cl.
CPC .............. *B64C 27/605* (2013.01); *B64F 5/40* (2017.01)

(58) Field of Classification Search
CPC ................................. B64C 27/605; B64F 5/40
See application file for complete search history.

(56) References Cited

U.S. PATENT DOCUMENTS

| | | | |
|---|---|---|---|
| 2,684,722 A * | 7/1954 | Perry | B64C 27/43 416/148 |
| 3,027,948 A * | 4/1962 | Goland | B64C 27/82 416/18 |
| 3,972,491 A * | 8/1976 | Ferris | B64C 27/32 244/17.27 |
| 6,074,168 A * | 6/2000 | Rampal | B64C 27/605 416/114 |
| 8,961,138 B2 * | 2/2015 | Wiinikka | B64C 27/605 416/114 |
| 8,985,951 B2 | 3/2015 | Rauber et al. | |
| 9,151,162 B2 | 10/2015 | Thompson et al. | |
| 9,365,288 B2 | 6/2016 | Stamps et al. | |
| 9,567,070 B2 | 2/2017 | Shundo et al. | |
| 2006/0237581 A1 * | 10/2006 | Gerbino | B64C 27/022 244/17.11 |
| 2008/0253891 A1 | 10/2008 | Cabrera et al. | |
| 2009/0242691 A1 | 10/2009 | Wittmer | |
| 2010/0266411 A1 * | 10/2010 | Stamps | B64C 29/0033 416/131 |
| 2014/0110525 A1 * | 4/2014 | Modrzejewski | B64C 27/605 244/99.2 |
| 2015/0053814 A1 | 2/2015 | Stamps | |
| 2016/0101851 A1 | 4/2016 | Hoyle et al. | |

FOREIGN PATENT DOCUMENTS

SU 1247591 A1 * 7/1986

* cited by examiner

*Primary Examiner* — Moshe Wilensky
*Assistant Examiner* — Joshua R Beebe
(74) *Attorney, Agent, or Firm* — Shackelford, Bowen, McKinley & Norton, LLP (57) ABSTRACT

An example rotating swashplate ring to rotor mast connection includes a polygon-shaped drive tube secured to the rotor mast and a gimbal joint connected between the rotating swashplate ring and the polygon-shaped drive tube, wherein the gimbal joint rotates with the rotor mast and can translate axially along the polygon-shaped drive tube.

19 Claims, 5 Drawing Sheets

ROTATING SWASHPLATE RING TO ROTOR MAST CONNECTION

BACKGROUND

This section provides background information to facilitate a better understanding of the various aspects of the disclosure. It should be understood that the statements in this section of this document are to be read in this light, and not as admissions of prior art.

Rotary-wing aircraft have at least one rotor for providing lift and propulsion forces. These rotors have at least two airfoil blades connected to a central hub, and the hub is connected to a rotatable mast driven in rotation by an engine or motor. These blades may be adjustable for pitch angle, and the pitch angle is typically controlled by a swashplate assembly and linkage for connecting a rotating portion of the swashplate assembly to each blade.

One example of a prior-art system includes a swashplate movable in directions parallel to the mast axis toward and away from the rotor for collective control and which tilts about axes perpendicular to the mast axis for cyclic control. When the swashplate moves toward or away from the rotor hub, the pitch angle of each blade changes by the same amount and in the same direction. This collective control system, which is often referred to as a "rise and fall" system, provides for control of the thrust of the rotor, which is measured generally coaxial to the mast. On the other hand, tilting of the swashplate causes the pitch of each blade to change sinusoidally, or cyclically, as the rotor rotates, which causes the rotor to develop lift forces that vary across the plane of the rotor.

SUMMARY

An example rotating swashplate ring to rotor mast connection includes a polygon-shaped drive tube secured to the rotor mast and a gimbal joint connected between the rotating swashplate ring and the polygon-shaped drive tube, wherein the gimbal joint rotates with the rotor mast and can translate axially along the polygon-shaped drive tube.

An example rotor assembly includes a rotor hub pivotally attached to a rotor blade, a rotor mast attached to the rotor hub, a swashplate having a non-rotating ring and a rotating ring, a polygon-shaped drive tube secured to the rotor mast, and a gimbal joint connected between the rotating ring and the polygon-shaped drive tube, wherein the gimbal joint rotates with the rotor mast and can translate axially along the polygon-shaped drive tube.

An example method includes accessing a rotor assembly located in a rotor aircraft, the rotor assembly having a rotor hub pivotally attached to a rotor blade, a rotor mast attached to the rotor hub, a swashplate comprising a non-rotating ring and a rotating ring, a polygon-shaped drive tube secured to the rotor mast, and a gimbal joint connected between the rotating ring and the polygon-shaped drive tube, wherein the gimbal joint rotates with the rotor mast and can translate axially along the polygon-shaped drive tube; and replacing a first wear insert located between a side of the polygon-shaped drive tube and the gimbal joint with a second wear insert.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

It is to be understood that the following disclosure provides many different embodiments, or examples, for implementing different features of various illustrative embodiments. Specific examples of components and arrangements they are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or different combination of features than the illustrative embodiment. Therefore, combinations of features disclosed in the following detailed description may not be necessary to practice the teachings in the broadest sense, and are instead merely to describe particularly representative examples. In addition, the disclosure may repeat reference numerals and/or letters in the various examples. This repetition is for the purpose of simplicity and clarity and does not in itself dictate a relationship between the various embodiments and/or configurations discussed.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features. Further, the figures may illustrate exemplary embodiments that show features or combination of features that are not required in one or more embodiments and thus a specific figure may disclose one or more embodiments that have fewer features or different combination of features than those shown in the illustrated embodiment.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard, "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

Figure 1:
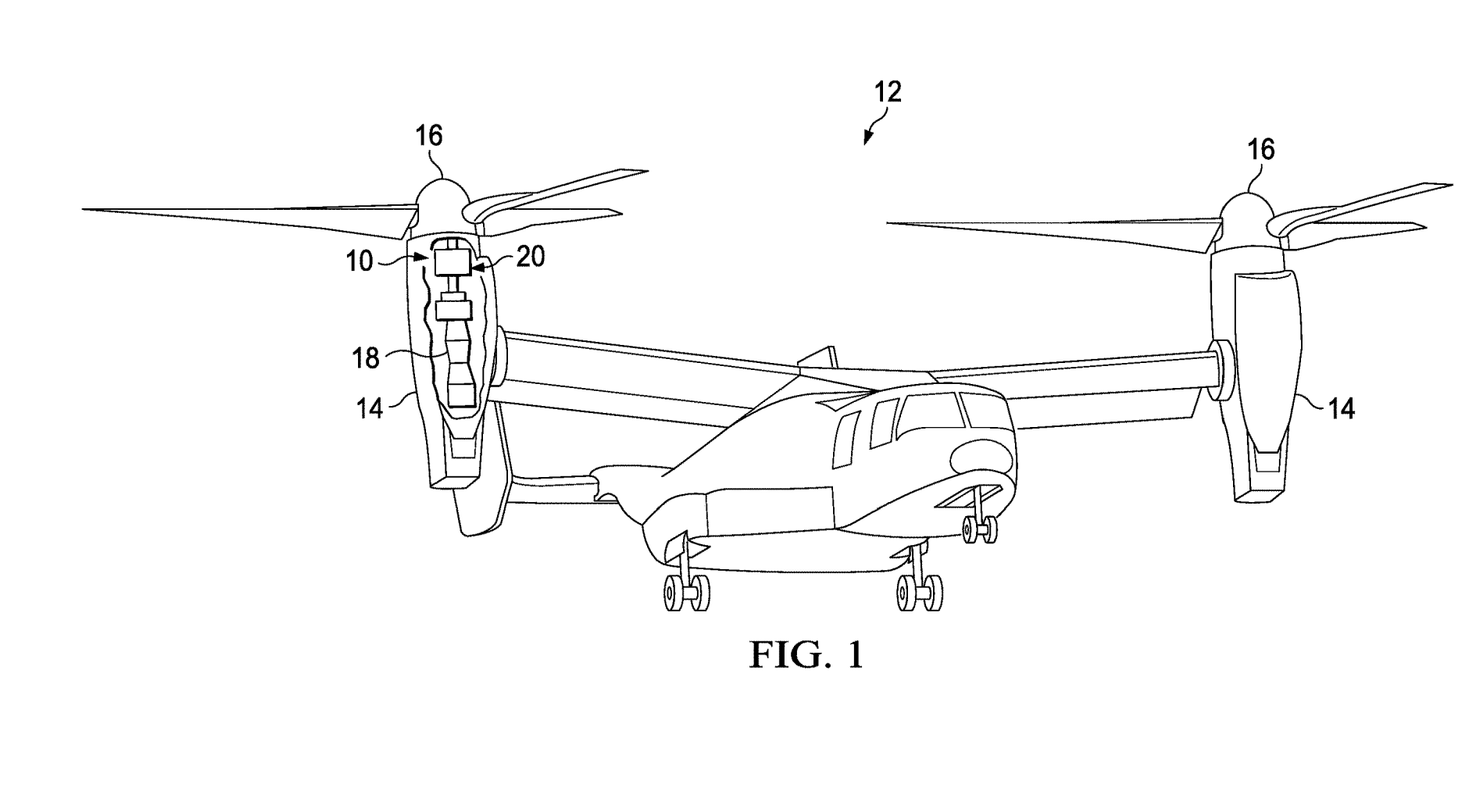
FIG. 1 is an illustrative example of an aircraft in which a rotating swashplate ring to mast connection according to aspects of the disclosure may be implemented.
Figure 2:
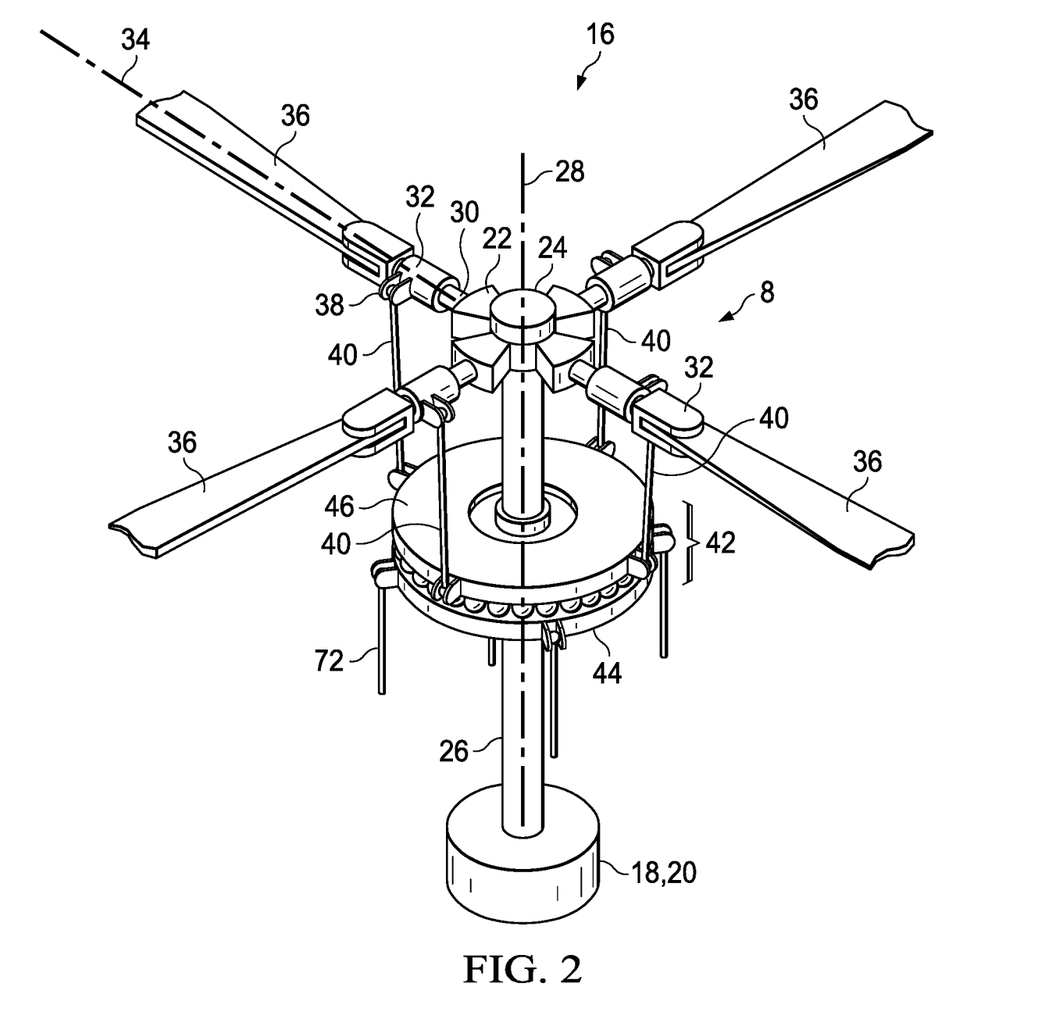
FIG. 2 is an illustrative example of a rotor assembly incorporating a rotating swashplate ring to mast connection according to aspects of the disclosure.
Figure 3:
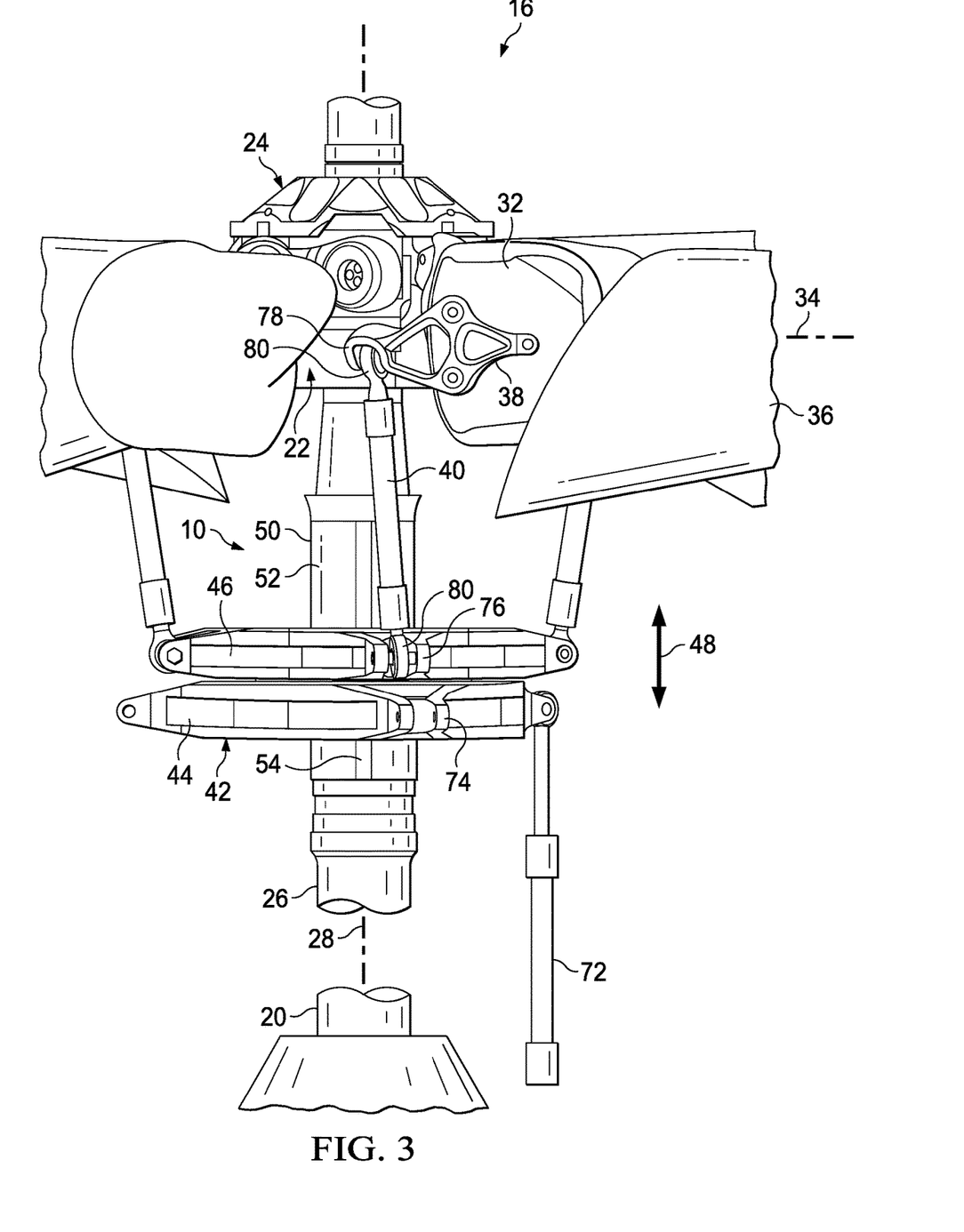
FIG. 3 illustrates an example of a rotating swashplate ring to mast connection according to aspects of the disclosure.

FIG. 1 illustrates an exemplary rotor aircraft 12 in a tiltrotor configuration operable in a helicopter mode and an aircraft mode. Rotor aircraft 12 includes two nacelles 14 each carrying a rotor assembly 16 incorporating a rotating swashplate ring to mast connection 10. A cutout view of one of the nacelles illustrates an engine 18 coupled to a gearbox 20.

With reference to FIGS. 1-4, an exemplary rotor assembly 16 includes a rotor mast 26 coupled to a rotor hub 8, which is coupled to rotor blades 36. The rotor hub 8 may optionally include a central yoke 22 rotatably mounted with a constant-velocity (CV) joint 24 to rotor mast 26. This allows yoke 22 to pivot about flap axes perpendicular to mast axis 28 of rotor mast 26 while rotor mast 26 drives yoke 22 in rotation with rotor mast 26 about mast axis 28.

During operation, the blades of a rotor system may move in a flapping motion, in which the blades move in out-of-plane directions due to aerodynamic forces on the blades. For example, during forward movement in rotor-borne flight, an advancing blade is subjected to a given speed of air across the blade, which produces lift on that blade and causes it to rise in an out-of-plane direction. A corresponding effect is seen with a blade on the opposite side of the rotor mast as it is retreating it is subjected to a lower speed of air across the blade resulting in the blade producing a smaller amount of lift. In a rotor having a yoke connected to the rotor mast with a gimbal, such as CV joint 24, the result of these two forces are that the yoke rotates about the flapping axes of the gimbal.

Yoke 22 comprises multiple arms 30 extending generally radially from the central region of yoke 22. A blade grip 32 is rotatably mounted to each arm 30, such that each grip 32 is rotatable relative to the associated arm 30 about a corresponding pitch axis 34. Grip 32 may be an integral, inboard portion of a rotor blade 36 or may be configured for attachment of a separate rotor blade 36. A fixed pitch horn 38 extends from an inner portion of each grip 32, and a rigid pitch link 40 is rotatably connected to each pitch horn 38. This configuration allows for movement of each pitch link 40 in directions generally parallel to mast axis 28 to cause rotation of the associated grip 32 and associated blade 36 about the corresponding pitch axis 34.

A swashplate assembly 42 comprises an inboard non-rotating swashplate ring 44 and an adjacent, coaxial, and outboard rotating swashplate ring 46, which is rotatably attached to non-rotating swashplate ring 44 with bearings in a manner that allows rotating swashplate ring 46 to freely rotate relative to non-rotating swashplate ring 44 about their shared axis while providing for transfer of mechanical forces (other than torsional forces about their shared axis) between swashplate rings 44 and 46. During operation, rotating swashplate ring 46 rotates along with rotor mast 26 and yoke 22 about rotor mast axis 28, whereas non-rotating swashplate ring 44 does not rotate with rotor mast 26 about mast axis 28.

Rotating swashplate ring 46 is coupled to rotor mast 26 in a manner that allows swashplate assembly 42 to translate axially 48 along the length of rotor mast 26 and to tilt about axes perpendicular to rotor mast 26.

The rotating swashplate ring to rotor mast connection 10 includes a polygon-shaped drive tube 50 and a gimbal joint 56. The polygon-shaped drive tube has three or more sides 52 and the adjacent sides 52 meet at a vertex 54. As will be understood by those of skill in the art with benefit of this disclosure, sides 52 may be planar or a curved arc connecting the vertices 54. The sides of the polygon-shaped drive tube 50 may have different lengths, for example, adjacent sides 52 meeting at a vertex 54 may have different lengths from each other. The polygon-shaped drive tube 50 can be secured to the rotor mast 26 in various fashions as known and understood by those skilled in the art.

The gimbal joint 56 comprises an inner ring 58, e.g., trunnion, and an outer ring 60. Gimbal joint 56 is torsionally locked to the rotor mast 26 through the polygon-shaped drive tube 50 that is secured to rotor mast 26. Gimbal joint 56 rotates with the polygon-shaped drive tube 50 and rotor mast 26 and can translate axially along a length of the polygon-shaped drive tube 50.

The inner ring 58 is torsionally locked and slidably affixed to polygon-shaped drive tube 50, allowing for translation of inner ring 58 to any position along a portion of polygon-shaped drive tube 50 and rotor mast 26. The inner ring 58 has a polygon-shape corresponding to the polygon-shaped drive tube 50. The sides 52 of the polygon-shaped drive tube and the sides 59 of the inner ring 58 torsionally lock the inner ring 58 to the polygon-shaped drive tube 50 and allow the gimbal joint 56 to slide axially along a portion of polygon-shaped drive tube 50.

Outer ring 60 is rotatably connected to opposing pivot mounts 62 of inner ring 58 at pivot mounts 64, allowing rotation of outer ring 60 relative to inner ring 58 about axis 66. Rotating swashplate ring 46 is rotatably attached to outer ring 60 at opposing pivot mounts 68, allowing rotation of rotating swashplate ring 46 relative to outer ring 60 about axis 70, which is perpendicular to axis 66.

To control the motions of swashplate assembly 42 relative to rotor mast 26, non-rotating swashplate ring 44 is connected to a swashplate actuation system at input clevises 74, which are equally spaced about non-rotating swashplate ring 44 every 120 degrees. Actuators 72 are connected to input clevises 74 for causing translation along rotor mast 26 of swashplate assembly 42 for collective blade-pitch control and/or tilting of swashplate assembly 42 for cyclic blade-pitch control. The operation of the actuation system is in response to inputs from a pilot and/or a flight control system.

To connect rotating swashplate ring 46 to pitch horns 38, three or four output clevises 76, depending on the number of blades, are equally spaced about rotating swashplate ring 46 for example every 120 or 90 degrees, and each pitch horn 38 has a clevis 78. Pitch links 40 comprise opposing spherical rod ends 80 or similar connectors for allowing pitch links 40 to rotate be connected to clevises 76, 78 while allowing for rotation of pitch links 40 relative to clevises 76, 78, as occurs during translation and/or tilting of swashplate assembly 42 and during flapping of yoke 22.

During operation of rotor assembly 16, torque is applied to rotor mast 26 and to yoke 22 through CV joint 24. Drive torque is transferred from rotor mast 26 to inner ring 58 of gimbal joint 56 through the sides 52 of polygon-shaped drive tube 50 and to outer ring 60 through pivot mounts 62, 64. Drive torque is transferred from outer ring 60 to rotating swashplate ring 46 through pivot mounts 68, causing the rotating swashplate ring 46 to rotate about the mast axis 28 together with rotor mast 26 and yoke 22.

The swashplate actuation system causes swashplate assembly 42 to translate axially along the polygon-shaped drive tube 50 and/or tilt relative to rotor mast 26. When swashplate assembly 42 is translated in directions indicated by bi-directional arrow 48, the motion parallel to mast axis 28 of swashplate assembly 42 is transferred from non-rotating swashplate ring 44 to pitch horns 38 through the mechanical connections of non-rotating swashplate ring 44 to rotating swashplate ring 46. This motion is transferred through pitch links 40 to each pitch horn 38, resulting in collective control of the pitch of all grips 32 and associated blades 36. Likewise, when swashplate assembly 42 is tilted, the tilting motion relative to mast axis 28 of swashplate assembly 42 is transferred from non-rotating swashplate ring 44 to pitch horns 38 through pitch links 40, resulting in differential, cyclic control of the pitch of all grips 32 and associated blades 36.

Figures 5, 6:
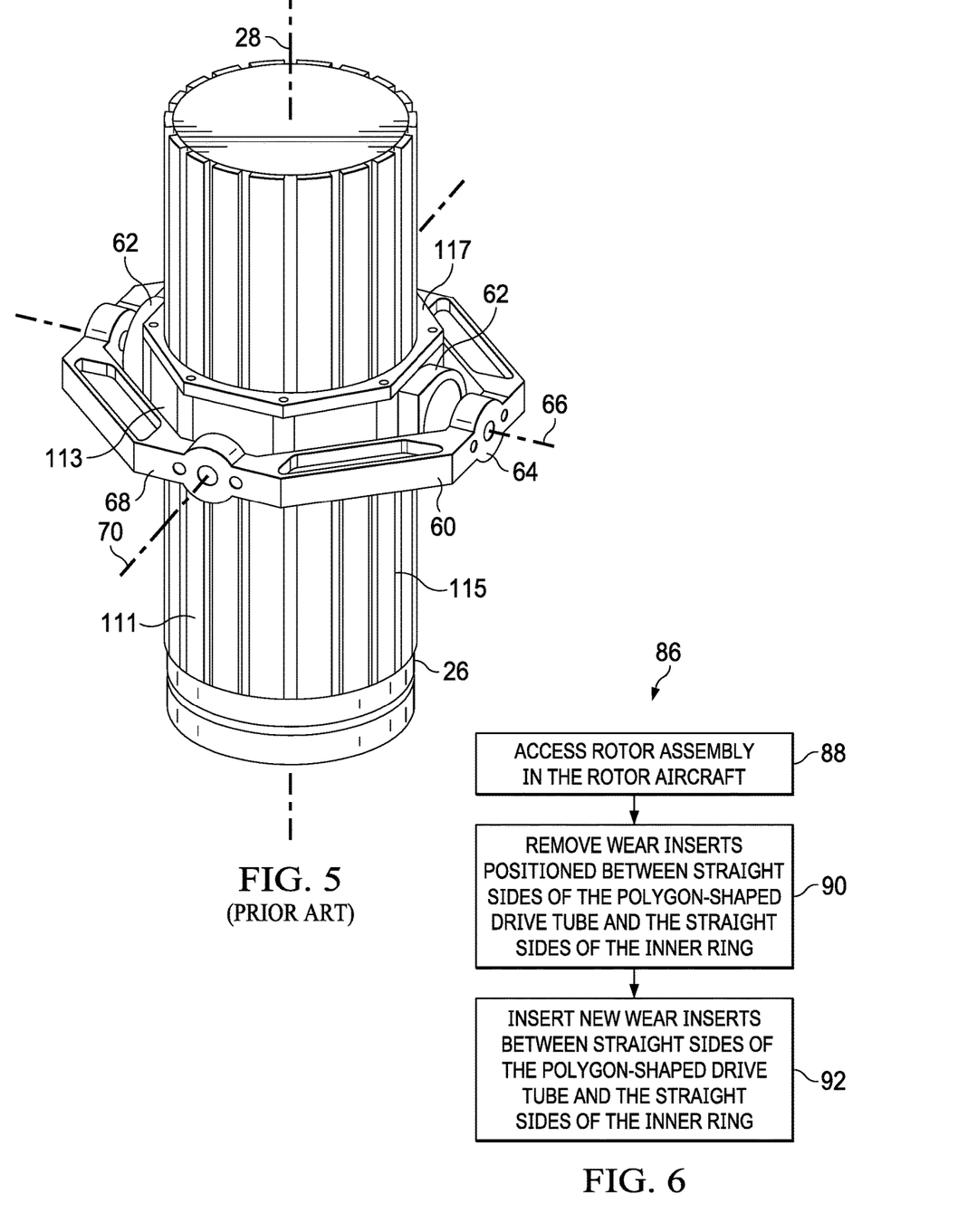
FIG. 5 illustrates an example of a prior art rotating swashplate ring connection to a round drive tube.
FIG. 6 is a block diagram of an exemplary method of replacing wear inserts in a rotating swashplate ring to mast connection according to aspects of the disclosure.

FIG. 5 illustrates an example of a prior art gimbaled rotating ring connection to a rotor mast 26. In the prior art connection a round drive tube 111 is secured to the rotor mast 26. The inner ring 113 is torsionally locked to the round drive tube 111 through axial splines 115 on the exterior surface of the round drive tube 111. A circular wear insert 117 is positioned around the circumference of the round drive tube 111 between the inner ring 113 and the round drive tube 111.

Figure 4:
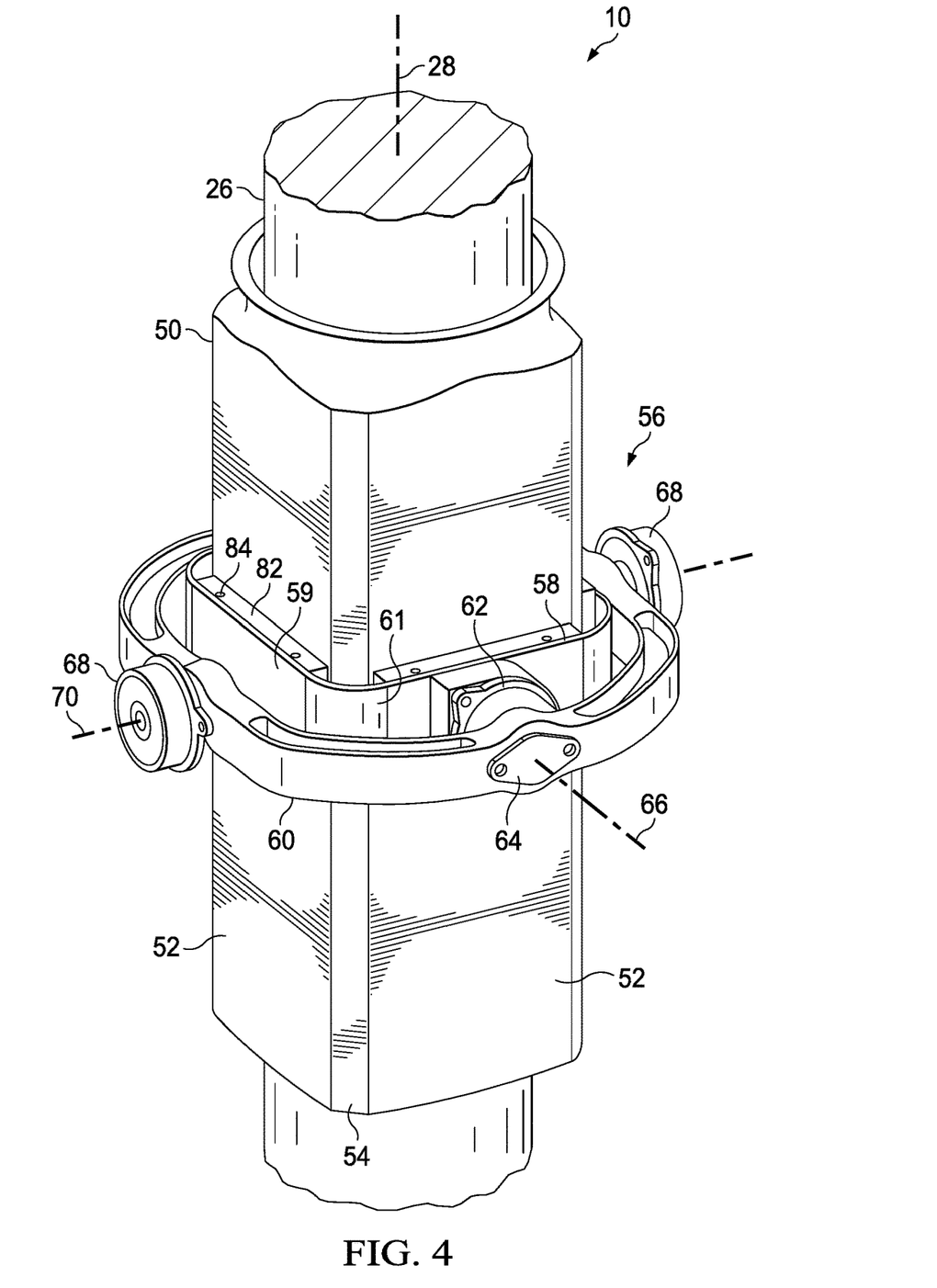
FIG. 4 illustrates an example of a polygon-shaped drive tube and gimbal joint in a rotating swashplate ring to mast connection according to aspects of the disclosure.

FIG. 4 illustrates an exemplary embodiment of a rotating swashplate ring to mast connection 10. In this example, the polygon-shaped drive tube 50 has four sides 52 and and four vertices 54. Similarly, the inner ring 58 has four sides 59 and four vertices 61. The polygon-shaped drive tube 50 may have only three sides 52 or it may have more than four sides 52. The sides 52 of the polygon-shaped drive tube 50 and the sides 59 of the inner ring 58 cooperate to torsionally lock polygon-shaped drive tube 50 and inner ring 58 together without using a spline connection between the gimbal joint 56 and the drive tube as used in the prior art gimbaled connection, see FIG. 5.

The drive tubes are commonly constructed of aluminum and are subject to wear. In some embodiments of the rotating swashplate ring to mast connection 10, the mating surfaces of the polygon-shaped drive tube 50 and/or the inner ring 58 are treated with a bearing coating to reduce wear and friction between the parts. Example coatings include without limitation tungsten carbide, chrome carbide, stainless steel and ceramics. For example, the exterior surface of polygon-shaped drive tube 50 and the inner surface of inner ring 58 may be anodized. Anodization is an electrolytic passivation process used to increase the thickness of the natural oxide layer on the surface of metal parts. In one example embodiment, exterior surface of polygon-shaped drive tube 50 and/or the inner surface of inner ring 58 may be treated using a process called Keronite, which may produce a hard, dense ceramic surface layer on polygon-shaped drive tube 50 and/or inner ring 58. The prior art round drive tube 111 and inner ring 113 require cooperative splines that prevent treating the drive tube and/or inner ring with commonly available bearing coatings.

In accordance with some embodiments, wear inserts 82 are positioned between the sides 52 of the polygon-shaped drive tube 50 and the sides 59 of the inner ring 58. The wear inserts 82 may be constructed of various materials, including without limitation tungsten carbide. In an exemplary embodiment, the wear inserts 82 are sized to fit along length of the sides 52 between the adjacent vertices 54. The wear inserts 82 may be secured to the interior surface of the inner ring 58 for example with fasteners 84.

Wear material does not have to be located at the vertices 52 allowing for individual wear inserts 82 to be positioned along each side 52 as opposed to a single wear insert that extends circumferentially around the drive tube. For example, FIG. 5 illustrates a prior art circular wear insert 117 extending circumferentially around the round drive tube 111. The wear inserts 82 in a rotating swashplate ring to mast connection 10 can be removed and replaced without having to pull the complete hub and control assemblies as opposed to a prior art circular wear insert 117. This ease in replacing the wear inserts 82 may allow for the wear inserts to be replaced on a seagoing vessel as opposed to the prior art swashplate connections.

A method 86 of replacing wear inserts 82 in a rotating swashplate ring to mast connection 10 is now described with reference to FIGS. 1-4 and 6. At block 88, a person accesses the rotor assembly 16 located in a rotor aircraft 12. At block 90, the installed wear inserts 82 are individually removed from between the sides 52 of the polygon-shaped drive tube 50 and the sides 59 of the inner ring 58 without removing the rotor hub 8 assembly from the mast. At block 92, new wear inserts 82 are inserted where the first wear inserts were removed from between the sides 52 of the polygon-shaped drive tube 50 and the sides 59 of the inner ring 58.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A rotating swashplate ring to rotor mast connection, comprising:
   a polygon-shaped drive tube secured to the rotor mast, the polygon-shaped drive tube comprising three or more tube sides with adjacent tube sides of the three or more tube sides converging at a vertex;
   a gimbal joint surrounding the polygon-shaped drive tube and connected between the rotating swashplate ring and the polygon-shaped drive tube, wherein the gimbal joint rotates with the rotor mast and can translate axially along the polygon-shaped drive tube;

the gimbal joint comprising a trunnion and an outer ring, the trunnion surrounding the polygon-shaped drive tube, the trunnion comprising three or more trunnion sides with adjacent trunnion sides of the three more trunnion sides converting at a vertex and arranged in a polygon-shape corresponding to the polygon-shaped drive tube, wherein the three or more trunnion sides and the three or more tube sides torsionally lock the trunnion to the polygon-shaped drive tube;

the outer ring surrounding the trunnion and rotatably connected to the trunnion by opposing first pivot mounts allowing rotation of the outer ring relative to the trunnion about a first axis;

the rotating swashplate ring surrounding the outer ring and rotatably connected to the outer ring by opposing second pivot mounts allowing rotation of the rotating swashplate ring relative to the outer ring about a second axis, wherein the first axis and the second axis are generally perpendicular to one another;

wear inserts positioned between the trunnion and the polygon-shaped drive tube, wherein the wear inserts comprise:

a first wear insert positioned between and in contact with a first tube side of the three or more tube sides and a first trunnion side of the two or more trunnion sides;

a second wear insert positioned between and in contact with a second tube side of the three or more tube sides and a second trunnion side of the two or more trunnion sides; and a third wear insert positioned between and in contact with a third tube side of the three or more tube sides and a third trunnion side of the two or more trunnion sides.

2. The rotating swashplate ring to rotor mast connection of claim 1, wherein the polygon-shaped drive tube is metal or composite and comprises an exterior bearing coating.

3. The rotating swashplate ring to rotor mast connection of claim 1, wherein the three or more tube sides do not have splines.

4. The rotating swashplate ring to rotor mast connection of claim 1, wherein the wear inserts are not positioned at the vertex of the adjacent tube sides.

5. The rotating swashplate ring to rotor mast connection of claim 1, wherein the three or more tube sides do not have splines; and the wear inserts are not positioned at the vertex of the adjacent tube sides.

6. A rotor assembly, comprising:
a rotor hub pivotally attached to a rotor blade;
a rotor mast attached to the rotor hub;
a swashplate comprising a non-rotating swashplate ring and a rotating swashplate ring;
a polygon-shaped drive tube secured to the rotor mast, the polygon-shaped drive tube comprising three or more tube sides with adjacent tube sides of the three or more tube sides converging at a vertex;
a gimbal joint surrounding the polygon-shaped drive tube and connected between the rotating swashplate ring and the polygon-shaped drive tube, wherein the gimbal joint rotates with the rotor mast and can translate axially along the polygon-shaped drive tube;
the gimbal joint comprising a trunnion and an outer ring, the trunnion surrounding the polygon-shaped drive tube, the trunnion comprising three or more trunnion sides with adjacent trunnion sides of the three more trunnion sides converting at a vertex and arranged in a polygon-shape corresponding to the polygon-shaped drive tube, wherein the three or more trunnion sides and the three or more tube sides torsionally lock the trunnion to the polygon-shaped drive tube;

the outer ring surrounding the trunnion and rotatably connected the trunnion by opposing first pivot mounts allowing rotation of the outer ring relative to the trunnion about a first axis; and the rotating swashplate ring surrounding the outer ring and rotatably connected to the outer ring by opposing second pivot mounts allowing rotation of the rotating swashplate ring relative to the outer ring about a second axis, wherein the first axis and the second axis are generally perpendicular to one another.

7. The rotor assembly of claim 6, further comprising wear inserts positioned between the polygon-shaped drive tube and the trunnion, wherein the wear inserts comprise:

a first wear insert positioned between and in contact with a first tube side of the three or more tube sides and a first trunnion side of the two or more trunnion sides;

a second wear insert positioned between and in contact with a second tube side of the three or more tube sides and a second trunnion side of the two or more trunnion sides; and a third wear insert positioned between and in contact with a third tube side of the three or more tube sides and a third trunnion side of the two or more trunnion sides.

8. The rotor assembly of claim 6, wherein the wear inserts are not positioned at the vertex of the adjacent tube sides.

9. The rotor assembly of claim 6, wherein the three or more tube sides do not have splines; and the wear inserts are not positioned at the vertex of the adjacent tube sides.

10. A method, comprising:
accessing a rotor assembly located in a rotor aircraft, the rotor assembly comprising a rotor hub pivotally attached to a rotor blade, a rotor mast attached to the rotor hub, a swashplate comprising a non-rotating ring and a rotating swashplate ring, a polygon-shaped drive tube secured to the rotor mast the polygon-shaped drive tube comprising three or more sides with adjacent tube sides of the three or more tube sides converging at a vertex, and a gimbal joint connected between the rotating swashplate ring and the polygon-shaped drive tube, wherein the gimbal joint rotates with the rotor mast and can translate axially along the polygon-shaped drive tube; and replacing a first wear insert located between and in contact with a first tube side of the three or more tube sides and a trunnion of the gimbal joint with replacement first wear insert; and wherein the gimbal joint comprises the trunnion and an outer ring, the trunnion surrounding the polygon-shaped drive tube, the trunnion comprising three or more trunnion sides with adjacent trunnion sides of the three more trunnion sides converting at a vertex and arranged in a polygon-shape corresponding to the polygon-shaped drive tube, wherein the three or more trunnion sides and the three or more tube sides torsionally lock the trunnion to the polygon-shaped drive tube;

the outer ring surrounding the trunnion and rotatably connected to the trunnion by opposing first pivot mounts allowing rotation of the outer ring relative to the trunnion about a first axis; and the rotating swashplate ring surrounding the outer ring and rotatably connected to the outer ring by opposing second pivot mounts allowing rotation of the rotating swashplate ring relative to the outer ring about a second axis, wherein the first axis and the second axis are generally perpendicular to one another.

11. The method of claim 10, wherein the replacing is performed without removing the rotor hub from the rotor mast.

12. The method of claim 10, further comprising replacing a second wear insert positioned between and in contact with a second tube side of the three or more tube sides and the trunnion without removing the rotor hub from the rotor mast.

13. The method of claim 10, wherein the rotor assembly comprises:
   the first wear insert located between and in contact with the first tube side of the three or more tube sides and the trunnion;
   a second wear insert positioned between and in contact with a second tube side of the three or more tube sides and the trunnion; and
   a third wear insert positioned between and in contact with a third tube side of the three or more tube sides and the trunnion.

14. The method of claim 13, wherein the replacing the first wear insert with the replacement first wear insert is performed without removing the rotor hub from the rotor mast.

15. The method of claim 10, wherein the rotor assembly comprises:
   the first wear insert located between and in contact with the first tube side of the three or more tube sides and a first trunnion side of the three or more trunnion sides;
   a second wear insert positioned between and in contact with a second tube side of the three or more tube sides and a second trunnion side of the three or more trunnion sides; and
   a third wear insert positioned between and in contact with a third tube side of the three or more tube sides and a third trunnion side of the three or more trunnion sides.

16. The method of claim 15, wherein the replacing the first wear insert with the replacement first wear insert is performed without removing the rotor hub from the rotor mast.

17. The method of claim 10, wherein the three or more tube sides do not have splines.

18. The method of claim 15, wherein the wear inserts are not positioned at the vertex of the adjacent tube sides.

19. The method of claim 18, wherein the replacing the first wear insert with the replacement first wear insert is performed without removing the rotor hub from the rotor mast.

* * * * *